US012775389B2

(12) United States Patent
Tiku et al.

(10) Patent No.: US 12,775,389 B2
(45) Date of Patent: Oct. 27, 2026

(54) PROACTIVE RESILIENCE TO THERMAL EVENTS IN A MEMORY DEVICE

(71) Applicant: Micron Technology, Inc., Boise, ID (US)

(72) Inventors: Saideep Tiku, Fort Collins, CO (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/774,683

(22) Filed: Jul. 16, 2024

(65) Prior Publication Data

US 2025/0123753 A1 Apr. 17, 2025

Related U.S. Application Data

(60) Provisional application No. 63/591,023, filed on Oct. 17, 2023.

(51) Int. Cl.
*G06F 3/06* (2006.01)

(52) U.S. Cl.
CPC .......... *G06F 3/0616* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | | |
|---|---|---|---|---|
| 2017/0060442 | A1* | 3/2017 | Dunn | G06F 3/0613 |
| 2017/0249091 | A1* | 8/2017 | Hodes | G06F 1/3296 |
| 2017/0357463 | A1* | 12/2017 | Muralimanohar | G06F 11/3058 |
| 2018/0004260 | A1* | 1/2018 | Amin-Shahidi | G06F 1/206 |
| 2018/0225187 | A1* | 8/2018 | Green | G06F 11/3058 |
| 2018/0348301 | A1* | 12/2018 | McKiernan | G01R 31/318342 |
| 2020/0089487 | A1* | 3/2020 | Ramic | G06F 8/61 |
| 2020/0159960 | A1* | 5/2020 | Jakobsson | G06F 21/6245 |
| 2022/0134815 | A1* | 5/2022 | Bill | G06F 3/0652 701/31.7 |
| 2023/0153014 | A1* | 5/2023 | Lee | G06F 3/0656 711/164 |
| 2023/0367378 | A1* | 11/2023 | Vaysman | G06F 1/3221 |

* cited by examiner

*Primary Examiner* — Jared I Rutz
*Assistant Examiner* — Alexander J Yoon
(74) *Attorney, Agent, or Firm* — Brooks, Cameron & Huebsch, PLLC

(57) ABSTRACT

The present disclosure includes apparatuses and methods related to receiving, by a System-on-Chip (SoC) device, a command sequence and predicting a thermal event that likely corresponds to the received command sequence. The command sequence may include an instruction code that can be representative of a mode of operation of a vehicle. In one embodiment, a thermal model may be used to predict the likely thermal event that corresponds to the command sequence. A thermal option may then be implemented to address adverse thermal effects of the predicted thermal event.

18 Claims, 8 Drawing Sheets

100

100

401

PROACTIVE RESILIENCE TO THERMAL EVENTS IN A MEMORY DEVICE

PRIORITY INFORMATION

This Application claims the benefit of U.S. Provisional Application No. 63/591,023, filed Oct. 17, 2023, the contents of which are included herein by reference.

TECHNICAL FIELD

The present disclosure relates generally to memory, and more particularly to apparatuses and methods associated with using thermal models to predict future thermal events and implementing corresponding measures (proactive adjustment) to maintain thermal operating conditions of a memory device and/or a host device.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

A computing system can include one or more memory devices that store data. In general, a host device can utilize memory devices to store data and retrieve data from the memory devices. Memory is also utilized as volatile and non-volatile data storage for a wide range of electronic applications. including, but not limited to automobiles, personal computers, portable memory sticks, digital cameras, cellular telephones, portable music players such as MP3 players, movie players, and other electronic devices.

DETAILED DESCRIPTION

Figure 1:
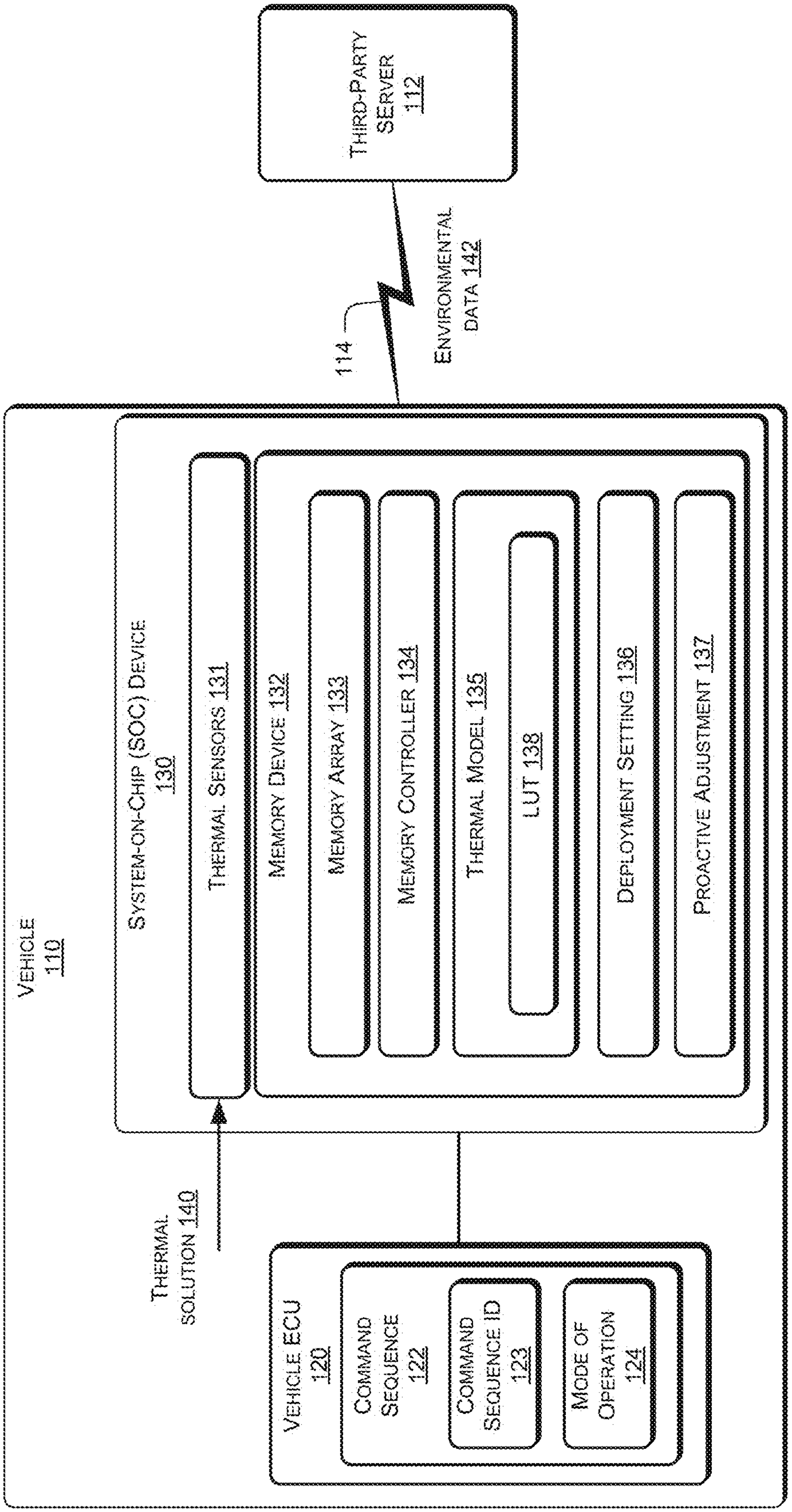
FIG. 1 is a functional block diagram in the form of a computing device that implements proactive resilience to thermal events in a memory device in accordance with a number of embodiments of the present disclosure.

The present disclosure includes apparatuses and methods related to storing and using of preconfigured thermal models by a System-on-Chip (SoC) device that includes a memory device to predict future thermal events that may affect operations of the SoC device and/or a host device that is coupled to the SoC device. Reacting to thermal events for memory devices is important, particularly for those functioning under higher levels of safety and reliability standards. An example of such a use case is in the vehicle memory sector, which typically includes stringent requirements for error detection and reporting to a host. Memory devices that operate close to thermal specification boundaries are expected to detect higher levels of errors. Under certain conditions, the memory device may need to shut down. Thermal throttling is one method to address this concern. However, such approaches are reactive in nature and kick in once thermal constraints are crossed. Such reactive systems are heavily dependent on the resolution of thermal sensor data that is available. The thermal sensors in memory devices may be unable to provide a sampling rate sufficient to react via thermal throttling.

One or more embodiments address the above and other concerns by establishing thermal models in the SoC device prior to deployment. A predefined thermal model is a thermal model that is defined prior to deployment of the SoC device. A thermal model is an abstraction of the physical layout (e.g., proximity to thermal solutions) and operation of the SoC device that simulates and/or calculates the heat response of the SoC device in various states of operation according to the physical layout. A thermal model can be used by the SoC device to proactively provide the host device with options to manage predicted thermal events. One or more of the thermal models can be lightweight (relatively quick and easy to execute) model types, such as linear or non-linear regression models so that the SoC can advantageously provide the host device with a warning of the predicted thermal event in time for the host to take action to prevent or ameliorate it.

The SoC device may integrate various components onto a single chip to provide a solution for a specific application and/or support a particular host device. Without limitation, the SoC device may include thermal sensors, a memory device, processing unit, memory, and I/O interfaces. One or more SoC devices that have the same configuration can be tested with a library of reference workloads.

In some embodiments, the SoC device may receive a command sequence from the host device and select a thermal model that corresponds to the received command sequence. The SoC device may then use the selected thermal model to predict the future thermal event, which can include a future thermal condition that can affect the operations of the SoC device.

Based on the predicted future thermal event, the SoC device may implement proactive measures in the SoC device and/or the host device. For example, the proactive measures may include deferring writes to memory arrays in the SoC device, throttling operations of the memory array, or similar operational adjustment that can be implemented by the SoC device or the host device.

As described herein, the command sequence includes multiple commands, each of which is an instruction code. Command sequences can be associated with a mode of operation of the host device. Each command sequence may include a distinct command sequence identification (ID) and is further associated with a particular mode of operation. For a host device that is a vehicle, the mode of operation may include, for example, power off, power on, standby mode, the vehicle running at a high speed or low speed, active air conditioning system, battery-operated mode, or other modes of operation. In another example, for a host device that is a power supply, the mode of operation may include low-voltage output, high-voltage output, fast charging rate, or other modes of operation. In these examples, the SoC device may include a table such as look-up table (LUT) or similar structure that can store pairings between the different command sequences and corresponding preconfigured thermal models.

In some embodiments, the SoC device may determine an indication of a thermal solution (e.g., automatically detect the thermal solution) or receive the indication of the thermal solution (e.g., as provided by a user) associated with the deployment of the SoC device. The thermal solution can include physical characteristics of the deployment of the SoC device in the host device. The thermal solution may include proximity of the SoC device to fans of the host device, proximity of the memory device to processors, presence of heat sinks in the memory device, and/or other configuration of deployment of the SoC device relative to other components or circuitries of the host device that may affect the thermal operation of the SoC device. In these embodiments, the SoC device may use a predefined thermal model that corresponds to the SoC device and to the thermal solution to predict the future thermal event. For example, the SoC device may include the LUT or similar structure that stores the different thermal solutions and their corresponding thermal models. In this example, the thermal model that is associated with the detected or received thermal solution may be used to predict the future thermal event.

In some embodiments, the SoC device may detect or receive an indication of a deployment setting of the memory device that can include operating conditions or electrical parameters of the memory device. The operating conditions or electrical parameters can be operating current, operating voltages, access rates, or a thermal constraint of the deployed memory device. In these embodiments, the SoC device may use a corresponding thermal model to predict the future thermal event. For example, the SoC device may include the LUT or similar structure that stores the different deployment settings and their corresponding thermal models. In this example, the thermal model that is associated with the detected or received deployment setting may be used to predict the future thermal event.

In some embodiments, the SoC device may receive environmental data from a third-party server. The environmental data may include weather reports, third-party news reports, social media postings, or the like, which may describe a current disposition of a surrounding environment and real-time events that are proximate to a geolocation of the SoC device. For example, the SoC device may determine its geolocation and by extension, the geolocation of the host device where the SoC device is embedded. In this example, the SoC device may use the determined geolocation to receive the environmental data, such as ambient air temperature, humidity, etc., from the third-party server. In these embodiments, the SoC device may use a corresponding thermal model to predict a future thermal event. For example, the SoC device may include the LUT that stores different environmental data and their corresponding thermal models. In this example, the thermal model that is associated with the received environmental data may be used to predict the future thermal event.

As described herein, the command sequences, deployment setting, thermal solution, environmental data, or a combination thereof, may be referred to as thermal model features (or thermal data). In some embodiments, the LUT may store the thermal model features and corresponding thermal model. For a particular thermal model feature, the best fit thermal model may include the thermal model that was trained using the same particular thermal model feature during an offline phase. The offline phase may include a pre-deployment period of the SoC device during which the thermal models were developed. Stated another way, the best fit thermal model is selected based upon one or more thermal model features that were used to train the thermal model during the pre-deployment period. In this regard, and during an online phase, the best fit thermal model may output the same type or nature of predictions during the deployment period.

The predicted future thermal event may include a predicted temperature or thermal condition that may affect the thermal operations of the SoC device and/or the host device. The projected temperature or thermal condition can be presented as a discrete number or presented as a level of temperature. In some embodiments, the SoC device may further store recommended proactive measures for different predicted thermal events. The stored proactive measures may be initiated by the SoC device and can be implemented by the SoC device and/or the host device.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and similar element may be referenced as 220 in FIG. 2. Further, analogous elements within a Figure may be referenced with a hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of computing system 100 that implements proactive resilience to thermal events in the memory device. Proactive resilience to thermal events may include implementation of measures to mitigate impact of thermal-related issues. Thermal events, such as excessive heat or temperature variations, can negatively affect performance, reliability, and durability of memory devices. In some embodiments, the proactive resilience to thermal events may be implemented by using thermal models to predict future thermal events and then executing preventive measures to counter the anticipated effects of the predicted future thermal events.

As shown, computing system 100 may include a vehicle 110 that is coupled to a third-party server 112 via one or more network(s) 114. Vehicle 110 is presented as an example host device. Vehicle 110 may include, without limitation, vehicle electronic control unit (ECU) 120, command sequence 122, and a SoC device 130. Command sequence 122 may include a command sequence identification (ID) 123 that can be paired with a mode of operation 124. Without limitation, the SoC device 130 may include thermal sensors 131 and a memory device 132, which further includes a memory array 133, memory controller 134, thermal model 135 with a LUT 138, deployment setting 136, and a proactive adjustment 137. As described herein, the computing system 100, vehicle 100, vehicle ECU 120, SoC device 130, and the memory device 132 may be considered as “apparatus.” Further, the host device may not be limited to vehicle 100. Different other host devices such as industrial machines, power supply, etc. with corresponding command sequence 122 may be implemented in accordance with the embodiments described herein.

Vehicle ECU 120 is an embedded system that controls and manages electronic functions and/or electrical systems of vehicle 110. The vehicle ECU 120 may serve as the brain of vehicle 110 and processes data to monitor the vehicle’s operating conditions. Vehicle ECU 120 may include processors (not shown) to adjust various parameters of vehicle 110 to maintain desired operations or operating conditions. In some embodiments, the vehicle ECU 120 may run the command sequence 122 to implement the mode of operation 124 of the vehicle 110. Without limitation, the mode of operation 124 may include preconfigured vehicle functions such as the vehicle 110 that is running at full speed, idle mode, slow mode, full activation of the AC systems while running at full speed, full activation of heating system, battery powered mode, engine brake, running at slow speed, or any combination thereof. Each mode of operation 124 may be represented by a corresponding command sequence ID 123. The command sequence ID 123 may include an identification that uniquely distinguishes a particular command sequence from previous, successive, or contemporaneous command sequences. For example, vehicle 110 changes speed every 5 minutes. In this example, the command sequence ID 123 may be used to uniquely identify the mode operation 124 every 5 minutes.

SoC device 130 may include hardware, software, or a combination thereof, that can be configured to specifically support the functionalities of the vehicle ECU 120 and by extension, the operations of the vehicle 110. The SoC device 130 can be one or more special-purpose processing devices such as an application specific integrated circuit (ASIC), a field programmable gate array (FPGA), or the like, that is coupled to or integrated with the vehicle ECU 120.

In some embodiments, the SoC device 130 may use the thermal sensors 131 to capture a thermal model feature (or thermal data) such as a thermal solution 140 that can include a configuration or physical characteristics of deployment of the SoC device 130. For example, the thermal solution 140 may include proximity of the memory device 132 to fans of the vehicle 110, proximity of the memory device 132 to heat-generating components, presence of heat sinks in the memory device 132, and/or other configurations of the memory device 132 relative to other components or circuitries of the vehicle 110 that may affect the thermal operation of the memory device 132. In this example, the thermal solution 140 may be used as the thermal model feature for the thermal model 135 to predict future thermal events (not shown). In other embodiments, the thermal solution 140 may include user-entered configurations of the memory device 132 relative to the other components of the vehicle 110 that may affect the thermal operation of the memory device 132. In this case, the SoC device 130 may use a communication interface (not shown) to receive the user-entered thermal solution 140 from an external source, for example, and use the user-entered thermal solution 140 as a thermal model feature for the thermal model 135.

The thermal sensors 131 may include a recording device, heat sensor, or any other device sensor that can detect thermal data from a surrounding environment proximate to vehicle 110. In some embodiments, the thermal sensors 131 may capture image data, audio data, current geolocation of the SoC device 130, workloads in vehicle ECU 120, workloads in the memory device 132, and the like. Workloads in memory device 132 may include read and/or write operations. In other embodiments, the thermal sensors 131 may receive another thermal model feature such as environmental data 142 from the third-party server 112.

The third-party server 112 is a remote server that can provide the environmental data 142 that can be associated with the geolocation of the vehicle 110. Environmental data 142 is a thermal model feature that can include weather reports, third-party news reports, social media posting, or the like, which describe the disposition of a surrounding environment and the real-time events that are occurring proximate to the current geolocation of the vehicle 110. In some embodiments, the SoC device 130 may use the received/detected environmental data 142, command sequence 122, thermal solution 140, deployment setting 136, or a combination thereof, as the thermal model feature for the thermal model 135 to predict the future thermal events.

The memory array 133 are apparatuses, which can be part of memory chips or memory packages that can provide physical memory for the SoC device 130, and vehicle ECU 120. The memory array 133 can be used as additional memory or primary storage for the computing system 100. The memory array 133 may include different types of memory depending upon requirements of the host device—vehicle 110.

The memory controller 134 can communicate with the thermal sensors 131, memory array 132, vehicle ECU 120, thermal model 135, deployment setting 136, and the proactive adjustment 137 to perform operations such as reading data, writing data, running the thermal model 135, initiating the proactive adjustment 137, and other such operations. In some implementations, the memory controller 134 may represent more general-purpose processing devices such as a microprocessor, central processing unit, or the like. More particularly, the memory controller 134 may be a complex instruction set computing (CISC) microprocessor, reduced instruction set computing (RISC) microprocessor, very long instruction word (VLIW) microprocessor, or a processor implementing other instruction sets. The memory controller 110 may also be one or more special-purpose processing devices such as an ASIC, FPGA, a digital signal processor (DSP), network processor, or the like.

The memory controller 134 may use the thermal model feature such as the command sequence 122, detected or received thermal solution 140, deployment setting 136, received environmental data 142, or a combination thereof, to select the thermal model 135 for predicting the future thermal event. In some embodiments, the thermal model 135 may include the LUT 138 that stores each of the thermal model feature and corresponding thermal model 135. In these embodiments, the corresponding thermal model 135 may be associated with the same features (i.e., the same type of input samples during the offline phase) to make the same type or nature of predictions during the online phase. For example, a particular command sequence may be used to train a particular thermal model during pre-deployment period. In this example, and during the deployment period, the particular thermal model may utilize the same feature (particular command sequence) to predict the same type or nature of predictions during the online phase.

Thermal model 135 may employ one or more trained machine-learning algorithms to predict the future thermal event, based on the thermal model feature that includes the command sequence 122, thermal solution 140, deployment setting 136, environmental data, and/or similar thermal data. The algorithms may include a linear regression model, non-linear regression model, recurrent neural network, a long short-term memory network, or a transformer model.

The deployment setting 136 may refer to operating conditions or parameters of the memory device 132. The deployment setting 136 may include electrical parameters such as operating current/voltages, operating temperature range, erase/program voltage, refresh rates, read/write capabilities, and/or access rates of the memory device 132. In some embodiments, different memory device 132 may include different deployment setting 136 depending upon the functionalities of the host device that the memory device 132 supports. In these embodiments, each deployment setting 136 can be treated as a distinct thermal model feature that is associated with the thermal model 135.

The proactive adjustment 137 may be representative of actions or measures that correspond to the predicted future thermal event. The proactive adjustment 137 may include a plurality of adjustment options that can be provided to the host device. The adjustment options may include a selection of operational adjustments to mitigate the anticipated effects of the predicted thermal event. Upon selection, the host device may communicate to the SoC device 130 an indication of the selected operational adjustment option, and the host device can operate according to the selected operational adjustment option.

In some embodiments, proactive adjustment 137 may be initiated by the memory controller 134 and performed by the vehicle ECU 120 to counter the effects of the predicted thermal events. For example, the proactive adjustment 137 may include activating a fan, opening a vent, suggesting deactivation of an engine part, running a cooling mechanism, or changing the mode of operation 124 of the vehicle 110 at a projected time of occurrence of thermal throttling due to the predicted thermal event. In another example, the proactive adjustment 137 may include deferring writes to the memory array 133, controlled shutdown of the apparatus, throttle operations of the memory array 133, change the mode of operation of the host device, reducing a quality of operation of the deployed memory device to prevent exceeding a thermal constraint of the deployed memory device, and so on. In these examples, the memory controller 132 may send the proactive adjustment 137 (control signals) to the vehicle ECU 120 for execution. In alternative embodiments, the memory controller 132 may be configured to execute the proactive adjustment 137 for the vehicle ECU 120.

The one or more network(s) 114 may include public networks such as the Internet, private networks such as an institutional and/or personal intranet, or some combination of a private and public network(s). The one or more network(s) can also include any suitable type of wired and/or wireless network, including but not limited to local area network (LANs), wide area network(s) (WANs), satellite networks, cable networks, Wi-Fi networks, Wi-Max networks, mobile communications networks (e.g., 5G-NR, LTE, 3G, 2G), or any suitable combination thereof.

In some embodiments, and during an offline phase in a test environment, the thermal model 135 may be trained using thermal model feature such as historical data of command sequence 122, thermal solution 140, deployment setting 136, environmental data 142, and/or similar thermal data. In these embodiments, the LUT 138 is created to store the thermal model feature and the corresponding thermal model 135.

For example, the historical data of command sequence 122 may include quantity of read operations (command sequence) over a period where each read operation is uniquely identified by its associated command sequence ID 123. The historical read operations may also include data of corresponding predicted thermal events. In this example, the historical data of command sequence 122 may be used to train the corresponding model 135 during the offline phase.

Following the example above, and during online phase or deployment of the memory device 132, new samples of the same features (command sequence 122) may be used to select the corresponding thermal model 135 from the LUT 138 to predict the future thermal events.

In other embodiments, the thermal model 135 may be trained using a combination of thermal data. In these embodiments, and during the online phase or deployment of the memory device 132, new samples of the same features (combination of thermal data) may be used to select the corresponding thermal model 135 from the LUT 138 to predict the future thermal events.

Figure 2:
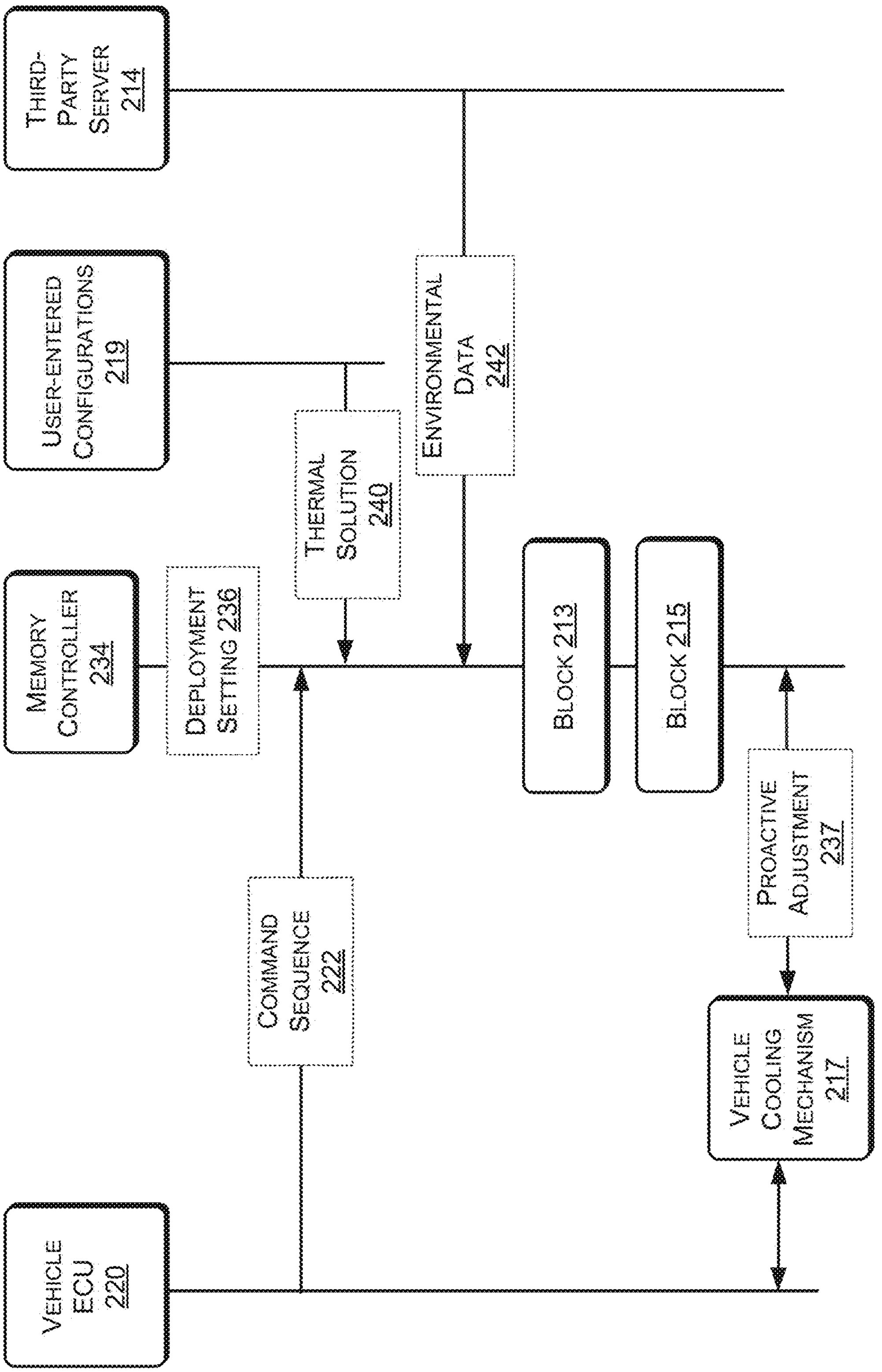
FIG. 2 is a block diagram of an operation of a System-on-Chip (SoC) memory controller that is configured to implement the proactive resilience to the thermal events in the memory device in accordance with a number of embodiments of the present disclosure.

FIG. 2 illustrates a block diagram of an operation of a memory controller 234 that is configured to implement the proactive resilience to thermal events in the memory device in accordance with a number of embodiments of the present disclosure. As shown, a memory controller 234 may include direct access to a deployment setting 236 and can further receive a command sequence 222 from a vehicle ECU 220. The command sequence 222 may include instructions or sequence of statements to carry out a particular mode of operation of the vehicle (not shown). In some embodiments, and at block 213, the memory controller 234 may select a thermal model from a plurality of thermal models (not shown) based on the received command sequence 222 and the deployment setting 236. In these embodiments, the selected thermal model may be treated as the best fit thermal model to predict the future thermal event based on the command sequence 222 and the deployment setting 236.

For example, memory controller 234 may receive the command sequence 222 that is associated with a particular mode of operation of the vehicle, and further receives access rates (deployment setting 236) of the memory device. In this example, and at block 213, the memory controller 234 may select the thermal model that is associated with the command sequence 222 and access rates of the memory device. In some implementations, the individual rather than a combination of the command sequence 222 or deployment setting 236 may be used to select the thermal model. In this case, the selected thermal model is based on the command sequence 222 or the deployment setting 236.

With the selected thermal model, and at block 215, the memory controller 234 may run the selected thermal model to predict the future thermal event, based at least in part on the command sequence 222 and/or the deployment setting 236. The memory controller 234 may further recommend a proactive adjustment 237 that corresponds to the predicted future thermal event. In some embodiments, a vehicle cooling mechanism 217 may receive and implement the proactive adjustment 237.

In some embodiments, the memory controller 234 may also receive a thermal solution 240 from user-entered configurations 219. The user-entered configurations 219 may include a configuration of deployment of the memory controller 234 or the SoC device (not shown). The user-entered configurations 219 for a particular SoC device may include location of the memory device relative to host device components that may affect thermal operation of the memory device, presence of heat sink in the memory device, etc. In these embodiments, and at block 213, the memory controller 234 may select the best fit thermal model based on the command sequence 222, access rates of the memory device, thermal solution 240, or a combination thereof.

With the selected thermal model, and at block 215, the memory controller 234 may run the selected thermal model to predict the future thermal event. The memory controller 234 may further generate and recommend the proactive adjustment 237 that corresponds to the predicted future thermal event.

In some embodiments, the memory controller 234 may further receive an environmental data from the third-party server 214. Environmental data 242 may include weather reports, third-party news reports, social media postings, or the like, which describe the disposition of a surrounding environment and the real-time events that are proximate to the geolocation of the vehicle ECU 220. In these embodiments, and at block 213, the memory controller 234 may select the best fit thermal model based on the command sequence 222, deployment setting 236, thermal solution 240, environmental data 242, or a combination thereof. Upon selection, and at block 215, the memory controller 234 may use the selected thermal model to predict the thermal event.

In the embodiments above, the memory controller 234 may monitor the command sequence 222, thermal solution 240, and/or the environmental data 242 continuously, per a predetermined schedule, or in response to a triggering event. Continuous monitoring may occur after the SoC device is powered ON, for example. Monitoring per a predetermined schedule may correspond, for example, to a monitoring activity occurring at any time interval, such as one minute, five minutes, 20 minutes, 30 minutes, or one hour. Monitoring in response to a triggering event may include, for example, using the reception of the command sequence 222 as a triggering condition for the monitoring.

Figure 3:
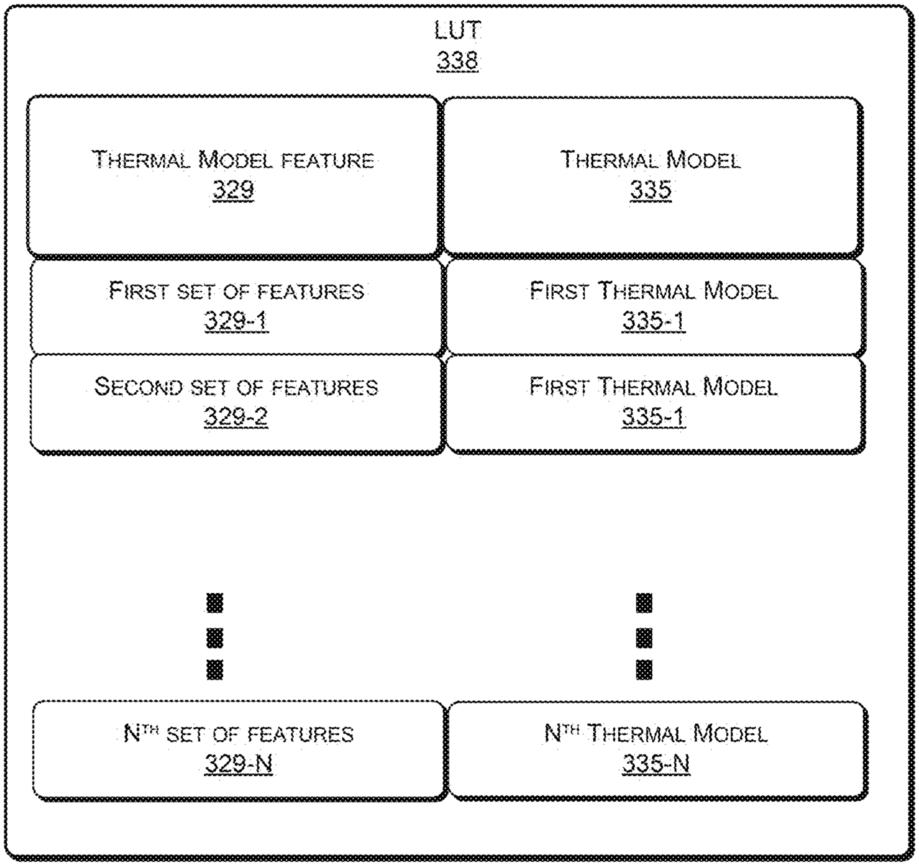
FIG. 3 is a block diagram of an example look-up table (LUT) in the memory device that stores a thermal model feature and a corresponding thermal model in accordance with a number of embodiments of the present disclosure.

FIG. 3 illustrates a block diagram of an example LUT 338 that stores a thermal model feature 329 and a thermal model 335 in accordance with a number of embodiments of the present disclosure. As shown, the thermal model feature 329 includes a first set of features 329-1, second set of features 329-2, and so on, which are respectively associated with a first thermal model 335-1, second thermal model 335-2, and so on, up to Nth thermal model 322-N. During the offline phase, each of the thermal model 335 may be trained using the same type of associated thermal model feature 329. In this regard, and during the online phase, the same thermal model feature may be used to select the best fit thermal model 335 that can generate the same type or nature of predictions. The corresponding thermal model 335 may run a linear regression model or algorithm, non-linear regression model or algorithm, recurrent neural network, a long short-term memory network, or a transformer model, to generate the predicted future thermal event as described herein.

In some embodiments, thermal model feature 329 may be preconfigured to include different command sequences that are representative of different corresponding mode of operations. In these embodiments, the corresponding thermal model 335 may predict the future thermal event based at least in part on the particular command sequence, which includes a particular command sequence ID. For example, the first set of features 329-1 may include a first command sequence that is representative of a first mode of operation of the host device, while the first thermal model 335-1 may include one or more trained machine learning algorithms to predict the future thermal event, based at least in part on the first command sequence. The first thermal model 335-1 may be selected based on preconfigured information of the associated first thermal model 335-1, which in this case includes the first command sequence. In this example, the first thermal model 335-2 may run the linear regression model or algorithm, non-linear regression model or algorithm, recurrent neural network, a long short-term memory network, or the transformer model to predict the future thermal event.

In some embodiments, thermal model feature 329 may be preconfigured to include different combinations of a command sequence and a deployment setting of the memory device. In these embodiments, the corresponding thermal model 335 may predict the future thermal event based at least in part on the command sequence and the combined deployment setting. For example, the first set of features 329-1 may include a first command sequence that is representative of a first mode of operation of the host device, and a deployment setting that is representative of normal temperature operation of the memory device. In this example, the first thermal model 335-1 may include one or more trained machine learning algorithms to predict the future thermal event, based at least in part on the first command sequence and the deployment setting. The first thermal model 335-1 may be selected based on preconfigured information of the associated first thermal model 335-1, which in this case includes the first command sequence and the deployment setting.

In some embodiments, thermal model feature 329 may be preconfigured to include different combinations of a command sequence and thermal solution of the memory device. In these embodiments, the corresponding thermal model 335 may predict the future thermal event based at least in part on the command sequence and the combined thermal solution. For example, the first set of features 329-1 may include a first command sequence that is representative of a first mode of operation of the host device, and a thermal solution that is representative of presence of a heat sink in the memory device. In this example, the first thermal model 335-1 may include one or more trained machine learning algorithms to predict the future thermal event, based at least in part on the first command sequence and the thermal solution. The first thermal model 335-1 may be selected based on preconfigured information of the associated first thermal model 335-1, which in this case includes the first command sequence and the thermal solution.

In some embodiments, thermal model feature 329 may be preconfigured to include different combinations of a command sequence and environmental data that is associated with the geolocation of the memory device. In these embodiments, the corresponding thermal model 335 may predict the future thermal event based at least in part on the command sequence and the combined environmental data. For example, the first set of features 329-1 may include a first command sequence that is representative of a first mode of operation of the host device, and an environmental data that is representative of cold weather or season of the year. In this example, the first thermal model 335-1 may include one or more trained machine learning algorithms to predict the future thermal event, based at least in part on the first command sequence and the environmental data. The first thermal model 335-1 may be selected based on preconfigured information of the associated first thermal model 335-1, which in this case includes the first command sequence and the environmental data.

In other embodiments, the best fit thermal model 335 may be selected by running each of the thermal model 335 using the thermal data. For example, the thermal data may include a first command sequence and a particular deployment setting. In this example, the memory controller 234 may run all the thermal model 335 using the same thermal data to generate a plurality of possible thermal events that are likely associated with the thermal data. Here, the memory controller 234 may employ another algorithm to rank the thermal model and then select the thermal model that best fits the thermal data. The best fit thermal model 335 may include the thermal model 335 that is preconfigured to be associated with the thermal data, which, in this example, includes the first command sequence and the particular deployment setting.

Figure 4:
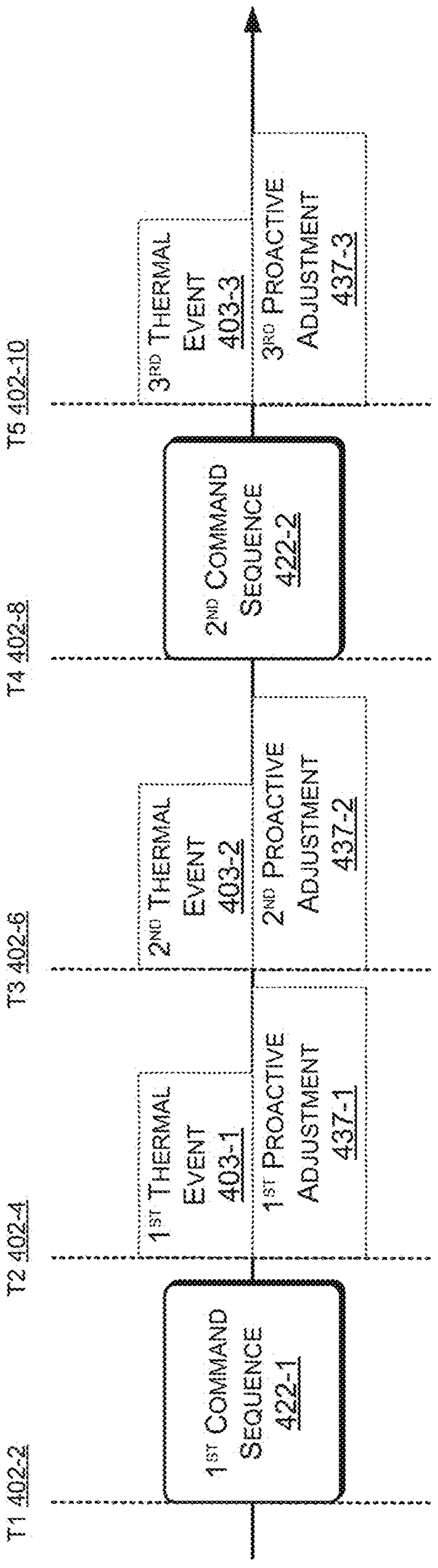
FIG. 4 is a block diagram of an example monitoring of command sequences and implementations of corresponding proactive adjustments in accordance with a number of embodiments of the present disclosure.

FIG. 4 illustrates diagram 401 of example monitoring of a command sequence 422 and implementation of corresponding proactive adjustment 437. As shown, diagram 401 includes time periods T1 402-2, T2 402-4, T3 402-6, T4 402-8, and T5 402-10, which can be measured in seconds, minutes, hours, etc. The diagram 401 further shows a first command sequence 422-1, a predicted first thermal event 403-1, first thermal option 437-1, predicted second thermal event 403-2, second thermal option 437-2, second command sequence 422-2, predicted third thermal event 403-3, and a third proactive adjustment 437-3.

In some embodiments, the memory controller may receive the first command sequence 422-1 at the first time period T1 402-2 and select the corresponding thermal model using, for example, a LUT that stores the thermal model feature and corresponding thermal model. Upon selection of the best fit thermal model, and at the second time period T2 402-4, the memory controller may run the selected best fit thermal model to predict the first thermal event 403-1. The memory controller may then select from a database (not shown) the corresponding 1$^{st}$ proactive adjustment 437-1 that can be implemented by the SoC device or host device to counter the thermal effects of the predicted future first thermal event 403-1.

At the third time period T3 402-6, the memory controller may monitor and capture another new sample of the first command sequence 422-1 and run the same selected thermal model to predict the future second thermal event 403-2. Similarly, the memory controller may then select from the database the corresponding 2$^{nd}$ proactive adjustment 437-2 that can be implemented by the SoC device or host device to counter the thermal effects of the predicted future second thermal event 403-2. In some implementations, different proactive adjustments may be associated for the same command sequence 422-1 due to different thermal effects for the same mode of operation at different time instants. For example, the first proactive adjustment 437-1 may include deferring writes to the memory array while the second proactive adjustment 437-2 may include adjusting mode of operation of the host device.

At the fourth time period 402-8, the memory controller may again receive another command sequence 433-2, which may represent a different mode of operation of the host device. The memory controller may then select the corresponding thermal model using, for example, the LUT that stores the thermal model feature and corresponding thermal model. Upon selection of the best fit thermal model, and at the fifth time period T5 402-10, the memory controller may run the selected best fit thermal model to predict the future third thermal event 403-3. The memory controller may then select from the database the corresponding third proactive adjustment 437-3 that can be implemented by the SoC device or host device to counter the thermal effects of the predicted future third thermal event 403-3.

Diagram 401 illustrates the predicting of the thermal events 403, based at least in part on the received command sequence 422. However, different additional thermal data such as the thermal solution, deployment setting, environmental data, or a combination thereof, may be utilized for selection of the best fit thermal model.

Figure 5:
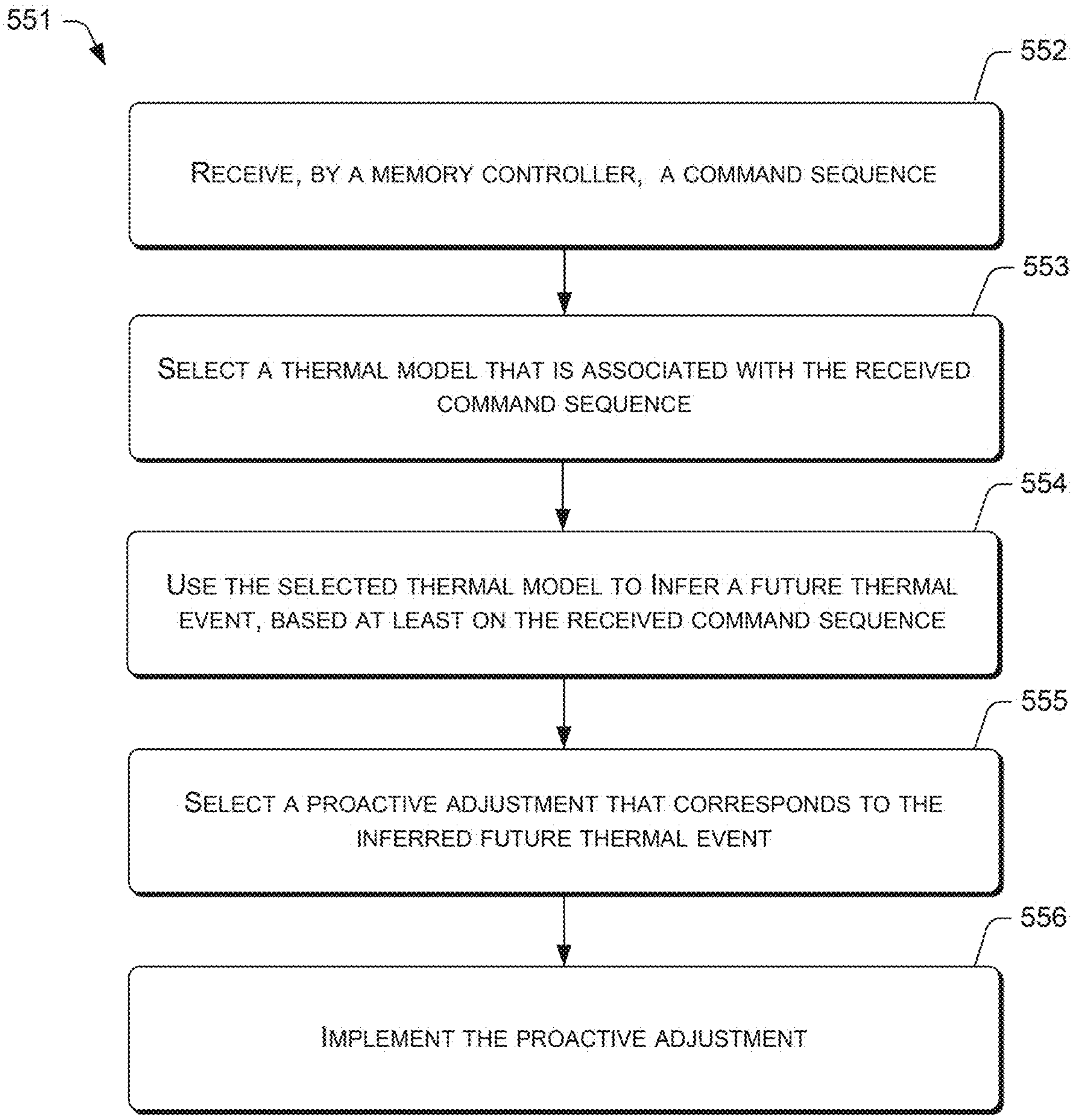
FIG. 5 is a flow diagram of a method for implementing a memory device that predicts a future thermal event, based at least in part on a received command sequence in accordance with a number of embodiments of the present disclosure.

FIG. 5 is a diagram of a method 551 for predicting a future thermal event, based at least in part on a received command sequence in accordance with a number of embodiments of the present disclosure. The methods described herein can be performed by hardware (e.g., a processing device, circuitry, dedicated logic, programmable logic, microcode, hardware of a device, integrated circuit, etc.). With respect to FIG. 1, for example, the method can be performed by circuitry associated with a memory device, such as the memory device 132 illustrated in FIG. 1. Although shown in a particular sequence or order, unless otherwise specified, the order of the processes with respect to any of the method flow diagrams described herein can be modified. Thus, the illustrated embodiments should be understood only as examples, and the illustrated processes can be performed in a different order, and some processes can be performed in parallel.

At block 552, the method can include receiving, by a memory controller, a command sequence. A vehicle ECU may transmit the command sequence to the memory controller. The command sequence may include a particular command sequence identification and a corresponding mode of operation. Without limitation, the mode of operation may include the vehicle running at full speed, idle mode, slow mode, full activation of the AC systems while running at full speed, full activation of heating system, battery-powered mode, engine brake, running at slow speed, and the like.

At block 553, the method can include selecting, by the memory controller, a thermal model that is associated with the received command sequence. The memory device may include a LUT that stores the thermal model feature and corresponding thermal model. In some implementations, the memory controller may use the LUT to search for the thermal model that is associated with the received command sequence. The best fit thermal model may include the thermal model that uses the same type of thermal model feature as that of the received command sequence during the offline phase.

In some embodiments, the predefined thermal models in the LUT may be trained based on a library of reference workloads for the SoC device-memory arrays. The library of reference workloads may include baseline workloads against which the memory device's performance can be evaluated and compared. By using the same reference workload across different memory SoC devices or memory devices, the relative performance of the SoC devices or memory devices for specific applications may be efficiently evaluated.

At block 554, the method can include using, by the memory controller, the selected thermal model to predict a future thermal event, based at least on the received command sequence. In some implementations, the predicted future thermal event may include using a discrete number of projected temperature or presented as a label/classification such as low risk of thermal throttling, medium risk of thermal throttling, and so on.

At block 555, the method can include selecting, by the memory controller, a proactive adjustment that corresponds to the predicted future thermal event. The proactive adjustment, for example, may include a change in mode of operation of the host device. In another example, the proactive adjustment may include a controlled shutdown of active components or the host device, deferring writes, etc.

At block 556, the method can include implementing, by the memory controller, the selected proactive adjustment. In some implementations, the host device may receive and implement the selected proactive adjustment.

Figure 6:
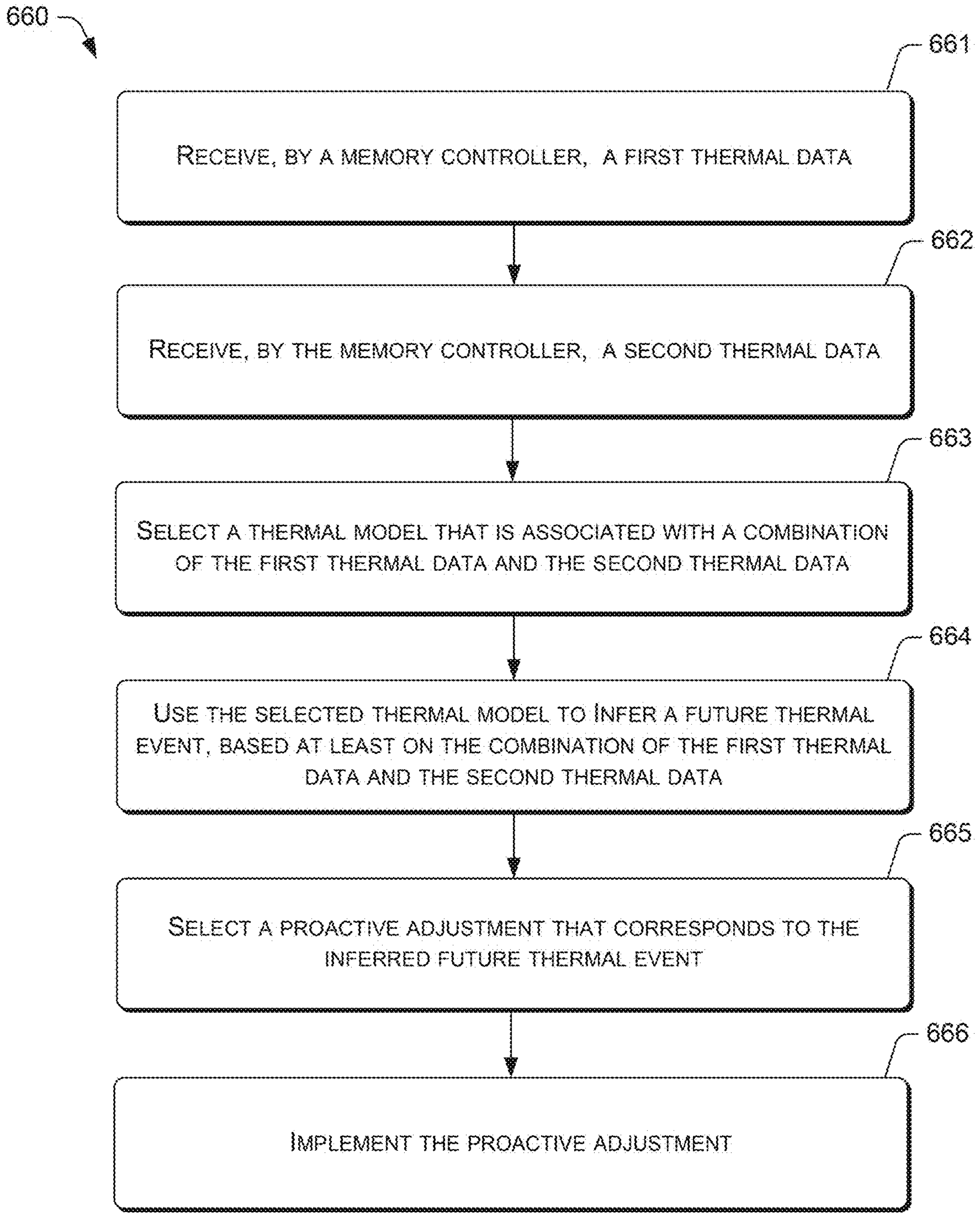
FIG. 6 is a flow diagram of a method for implementing the memory device that predicts the future thermal event, based at least in part on a received first thermal data and a second thermal data in accordance with a number of embodiments of the present disclosure.

FIG. 6 is a diagram of a method 660 for predicting a future thermal event, based at least in part on a combination of a first thermal data and a second thermal data in accordance with a number of embodiments of the present disclosure. The methods described herein can be performed by hardware (e.g., a processing device, circuitry, dedicated logic, programmable logic, microcode, hardware of a device, integrated circuit, etc.). With respect to FIG. 1, for example, the method can be performed by circuitry associated with a memory device, such as the memory device 132 illustrated in FIG. 1. Although shown in a particular sequence or order, unless otherwise specified, the order of the processes with respect to any of the method flow diagrams described herein can be modified. Thus, the illustrated embodiments should be understood only as examples, and the illustrated processes can be performed in a different order, and some processes can be performed in parallel.

At block 661, the method can include receiving, by a memory controller, a first thermal data. In some implementations, the first thermal data may include a command sequence, a particular thermal solution, deployment setting, an environmental data, or a combination thereof.

At block 662, the method can include receiving, by a memory controller, a second thermal data. In some implementations, the first thermal data may include another command sequence, thermal solution, deployment setting, environmental data, or any other feature that is different from the first thermal data. The second thermal data may include one or more thermal data feature that can be added to the first thermal data.

At block 663, the method can include selecting, by the memory controller, a thermal model that is associated with a combination of the first thermal data and the second thermal data. The memory device may include a LUT that stores the thermal model feature and corresponding thermal model. In some implementations, the memory controller may use the LUT to search for the thermal model that is associated with the combination of the first thermal data and the second thermal data. The best fit thermal model may include the thermal model that uses the received combination of the first thermal data and the second thermal data as exact feature during offline phase and online phase.

At block 664, the method can include using, by the memory controller, the selected thermal model to predict a future thermal event, based at least on the combination of the first thermal data and the second thermal data.

At block 665, the method can include selecting, by the memory controller, a proactive adjustment that corresponds to the predicted future thermal event. The proactive adjustment, for example, may include a change in mode of operation in the host or vehicle. In another example, the proactive adjustment may include a controlled shutdown of active components or the host device, deferring writes, etc.

At block 666, the method can include implementing, by the memory controller, the selected proactive adjustment. In some implementations, the host device may receive and implement the selected proactive adjustment.

Figure 7:
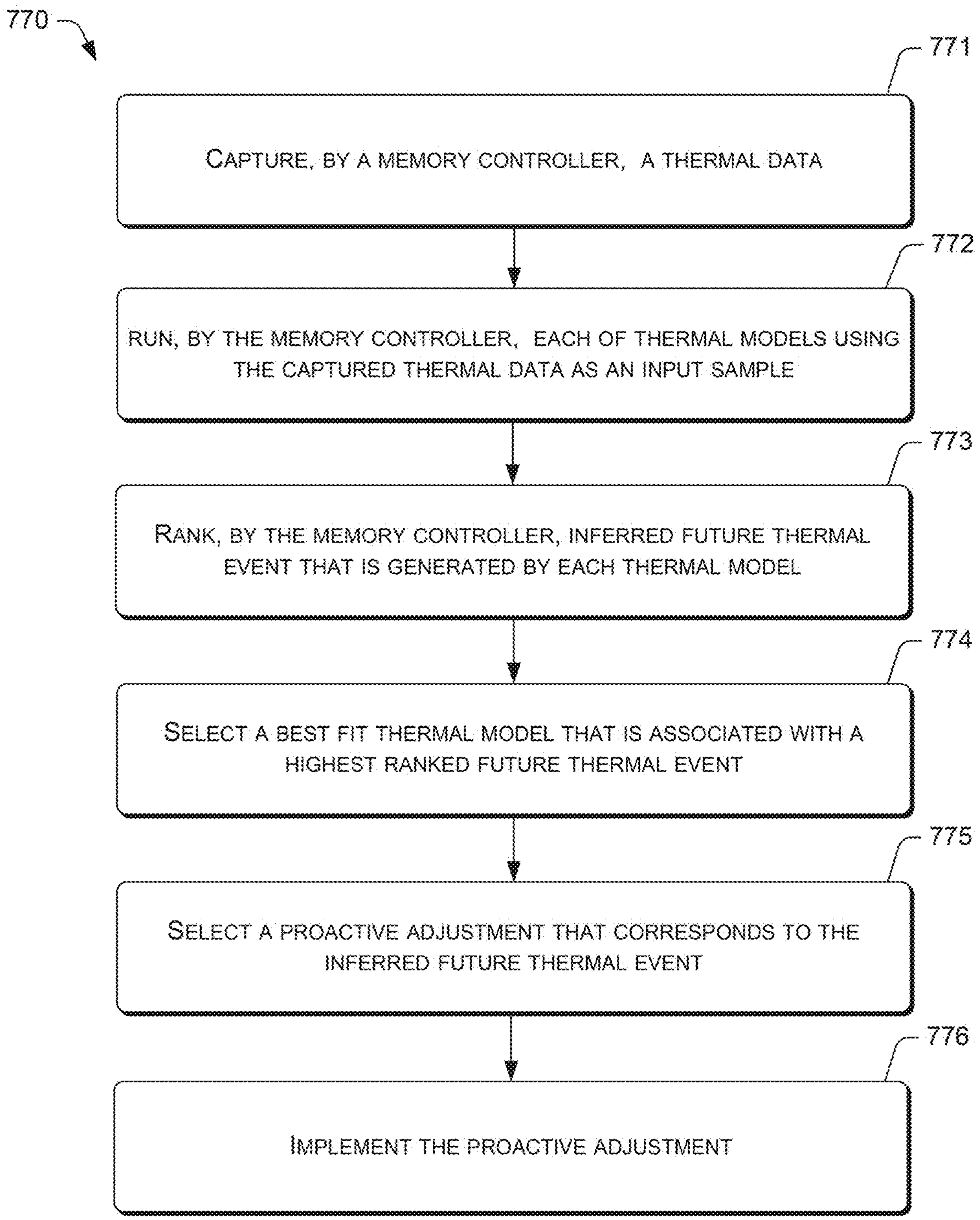
FIG. 7 is a flow diagram of a method for implementing the memory device that selects a best fit thermal model, based at least in part on a received/detected thermal data in accordance with a number of embodiments of the present disclosure.

FIG. 7 is a diagram of a method 770 for selecting a best fit thermal model, based at least in part on a received/detected thermal data. In some implementations, the selecting of the best fit thermal model may include searching for the thermal model that is associated with the same received/detected thermal data (or features). In contrast, the method 770 may run the different thermal models and rank the predicted future thermal events to find the best fit thermal model. The methods described herein can be performed by hardware (e.g., a processing device, circuitry, dedicated logic, programmable logic, microcode, hardware of a device, integrated circuit, etc.). With respect to FIG. 1, for example, the method can be performed by circuitry associated with a memory device, such as the memory device 132 illustrated in FIG. 1. Although shown in a particular sequence or order, unless otherwise specified, the order of the processes with respect to any of the method flow diagrams described herein can be modified. Thus, the illustrated embodiments should be understood only as examples, and the illustrated processes can be performed in a different order, and some processes can be performed in parallel.

At block 771, the method can include capturing, by a memory controller, a thermal data. The thermal data may include a command sequence, a particular thermal solution, deployment setting, an environmental data, or a combination thereof.

At block 772, the method can include running, by the memory controller, each of thermal models that were stored in the memory device using the thermal data as an input sample. The thermal models may generate corresponding output, based at least upon the thermal data as input sample.

At block 773, the method can include ranking, by the memory controller, the predicted future thermal event that is generated by each thermal model. In some implementations, the memory controller may employ another algorithm or a ranking model (not shown) to infer an ordered ranking of the thermal events that are likely associated with the thermal data. For example, the ranking model may assign weighting scores to different thermal events that were generated by the different thermal models. The weighting scores may reflect a quantitative measure of a likelihood that a particular thermal event may be associated with the thermal data. The weighting scores may be alpha-numeric (e.g., 0 to 10, or A to F), descriptive (e.g., likely associated, not associated), or any other suitable rating scale.

At block 774, the method can include selecting, by the memory controller, a best fit thermal model that is associated with the highest ranked future thermal event.

At block 775, the method can include selecting, by the memory controller, a proactive adjustment that corresponds to the predicted future thermal event.

At block 776, the method can include implementing, by the memory controller, the selected proactive adjustment. In some implementations, the host device may receive and implement the selected proactive adjustment.

Figure 8:
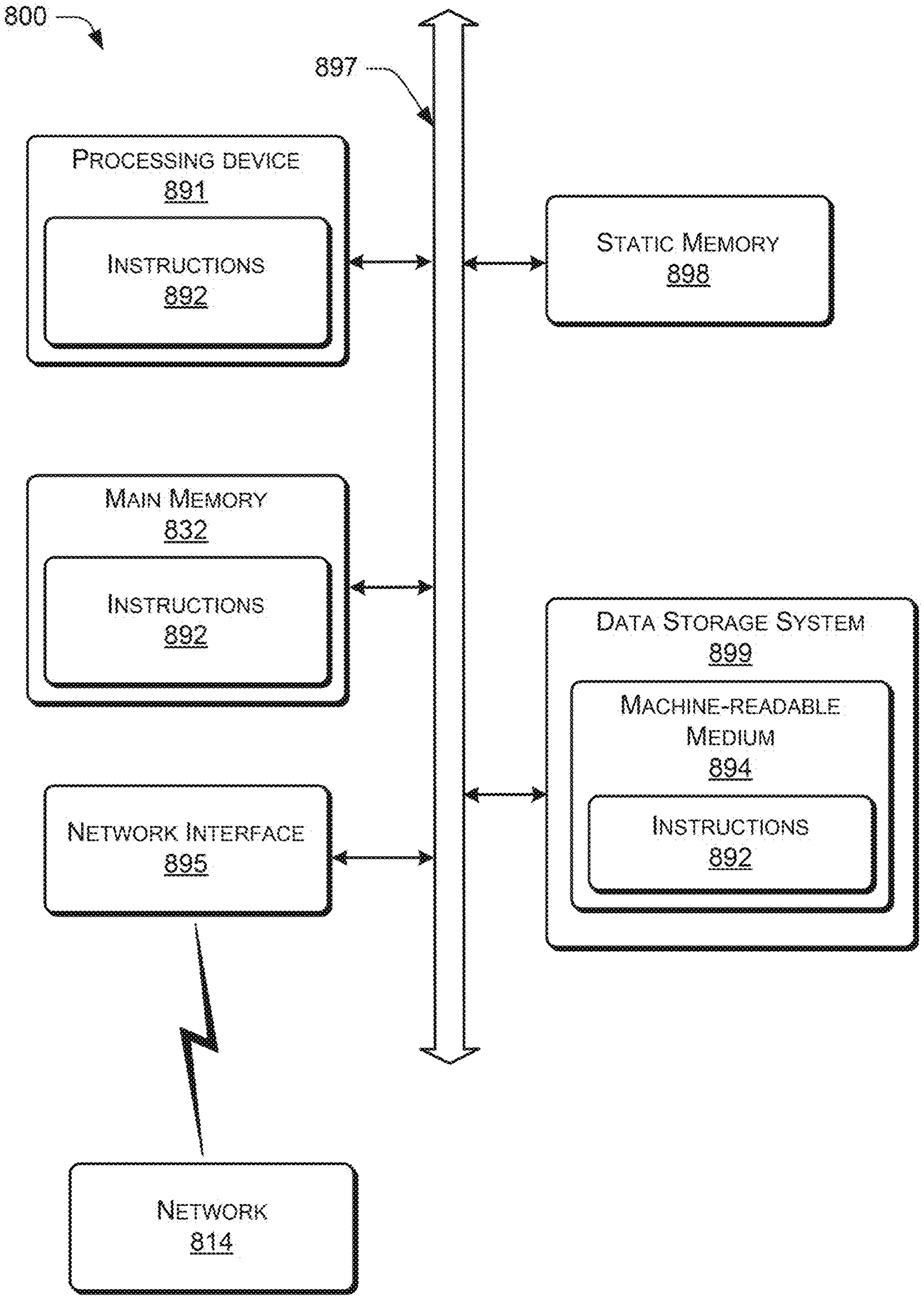
FIG. 8 illustrates an example computer system within which a set of instructions, for causing the machine to perform various methodologies discussed herein, can be executed.

FIG. 8 illustrates an example computer system 800 within which a set of instructions 892, for causing the machine to perform various methodologies discussed herein, can be executed. In various embodiments, the computer system 800 can correspond to a system (e.g., the computing system described with respect to FIG. 1). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 891, a main memory 832, a static memory 898 (e.g., flash memory, static random access memory (SRAM), etc.), and a data storage system 880, which communicate with each other via a bus 897.

The processing device 891 represents one or more general-purpose processing devices such as a microprocessor, a CPU, a GPU, or the like. More particularly, the processing device can be a CISC microprocessor, RISC microprocessor, VLIW microprocessor, or a processor implementing other instruction sets, or processors implementing a combination of instruction sets. The processing device 891 can also be one or more special-purpose processing devices such as an ASIC, an FPGA, a DSP, network processor, or the like. The processing device 891 is configured to execute instructions 892 for performing the operations and steps discussed herein. The computer system 800 can further include a network interface device 895 to communicate over the network 814.

The data storage system 880 can include a machine-readable storage medium 894 (also known as a computer-readable medium) on which is stored one or more sets of instructions 892 or software embodying any one or more of the methodologies or functions described herein. The instructions 892 can also reside, completely or at least partially, within the main memory 893 and/or within the processing device 891 during execution thereof by the computer system 800, the main memory 893 and the processing device 891 also constituting machine-readable storage media.

The instructions 892 can be executed to carry out any of the embodiments described herein. For example, the instructions 892 can be executed to implement functionality corresponding to the host, SoC device, and/or the memory device of FIGS. 1-2.

While the machine-readable storage medium 894 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory apparatus, comprising:

a memory array; and a controller coupled to the memory array, wherein the memory controller is configured to:

capture first thermal data of the apparatus during a first time period;

wherein the first thermal data includes a first command sequence, a thermal solution of the apparatus, and a deployment setting of the apparatus;

wherein the apparatus stores a plurality of predefined thermal models;

wherein each of the plurality of predefined thermal models is created in a test environment and each is associated with a respective different thermal solution or respective different deployment setting for the apparatus;

run each of the plurality of predefined thermal models using the first thermal data to generate respective outputs and rank the respective outputs based on a likelihood that each respective output is associated with the thermal data;

select one of the plurality of predefined thermal models having the respective output that best fits the first thermal data based on the ranking of the respective outputs;

capture second thermal data of the apparatus during a second time period after the first time period;

wherein the second thermal data includes a second command sequence;

predict a thermal event of the apparatus based on the first and second thermal data and the selected thermal model;

provide a plurality of operational adjustment options to a host device external to the apparatus including an operational adjustment option for changing a mode of operation of the host, each of the plurality of operational adjustment options determined to generate proactive resilience to the thermal event; and operate according to one of the plurality of operational adjustment options.

2. The memory apparatus of claim 1, wherein the controller is configured to:

receive an indication of a selected one of the operational adjustment options; and operate according to the selected operational adjustment option.

3. The memory apparatus of claim 1, wherein the plurality of operational adjustment options include one or more of a group of operational adjustment options including:

throttling operations of the memory array;

deferring writes to the memory array; and controlled shutdown of the apparatus.

4. The memory apparatus of claim 1, wherein the second command sequence corresponds to a current mode of operation of the host device external to the apparatus; and wherein the host device is a vehicle.

5. The memory apparatus of claim 1, wherein the plurality of predefined thermal models are trained based on a library of reference workloads for memory arrays and based on different physical characteristics of different memory apparatuses.

6. The memory apparatus of claim 1, further comprising a plurality of thermal sensors coupled to the controller and configured to provide thermal data related to operation of the apparatus to the controller.

7. The memory apparatus of claim 6, wherein the command sequence is received from a vehicle electronic control unit (ECU) that is coupled to the controller; and wherein the second thermal data further includes environmental data associated with a geolocation of the vehicle ECU.

8. The memory apparatus of claim 7, wherein the operational adjustment option includes an activation of a vehicle cooling mechanism.

9. An apparatus, comprising:

an electronic control unit (ECU) of a vehicle;

a System-on-a-Chip (SoC) coupled to the ECU, wherein the SoC further comprises:

a plurality of thermal sensors;

a memory array; and a controller coupled to the memory array and the plurality of thermal sensors, wherein the controller is configured to:

capture first thermal data of the apparatus during a first time period;

wherein the first thermal data includes a first command sequence from the ECU, a thermal solution of the apparatus, a deployment setting of the apparatus, and thermal data from the plurality of thermal sensors during operation of the SoC;

wherein the SoC stores a plurality of predefined thermal models;

wherein each of the plurality of predefined thermal models is created in a test environment and each is associated with a respective different thermal solution or respective different deployment setting for the apparatus;

run each of the plurality of predefined thermal models using the first thermal data to generate respective outputs and rank the respective outputs based on a likelihood that each respective output is associated with the thermal data;

select one of the plurality of predefined thermal models having the respective output that best fits the first thermal data based on the ranking of the respective outputs;

capture second thermal data of the apparatus during a second time period after the first time period;

wherein the second thermal data includes a second command sequence from the ECU;

predict a thermal event of the SoC based on the first and second thermal data and the selected thermal model; and provide a plurality of operational adjustment options to the ECU to generate proactive resilience to the thermal event, wherein the plurality of operational adjustment options includes an operational adjustment option for changing a mode of operation of the vehicle; and wherein the ECU is configured to operate according to one of the operational adjustment options.

10. The apparatus of claim 9, wherein the plurality of predefined thermal models are trained based on a library of reference workloads for the SoC and based on different physical characteristics of different SoC implementations in different vehicles; and wherein the controller is configured to select the one of the plurality of predefined thermal models further based on physical characteristics of the SoC implementation in the vehicle.

11. The apparatus of claim 9, wherein the plurality of thermal models include a linear regression model and a non-linear regression model.

12. The apparatus of claim 11, wherein the plurality of thermal models further include a recurrent neural network, a long short-term memory network, or a transformer model.

13. The apparatus of claim 9, wherein the controller is further configured to:

retrieve, from a third-party server, environmental data associated with a geolocation of the vehicle ECU; and predict the thermal event of the SoC based on the first and second thermal data, the selected thermal model, and the environmental data.

14. A method, comprising:

capturing first thermal data of a deployed memory device during a first time period;

wherein the first thermal data includes a first command sequence, a thermal solution of the deployed memory device, and a deployment setting of the deployed memory device;

wherein the memory device stores a plurality of predefined thermal models;

wherein each of the plurality of predefined thermal models is created in a test environment and each is associated with a respective different thermal solution or respective different deployment setting for the memory device;

running each of the plurality of predefined thermal models using the first thermal data to generate respective outputs and rank the respective outputs based on a likelihood that each respective output is associated with the thermal data;

selecting one of the plurality of predefined thermal models having the respective output that best fits the first thermal data based on the ranking of the respective outputs;

capturing second thermal data of the deployed memory device during a second time period after the first time period;

wherein the second thermal data includes a second command sequence;

predicting future thermal events for the deployed memory device based on the first and second thermal data and the selected thermal model;

selecting an operational adjustment option of a plurality of operational adjustment options based on the predicted future thermal events, wherein the plurality of operational adjustment options includes an operational adjustment option for changing a mode of operation of a host device external to the memory device; and proactively adjusting operation of the deployed memory device or the host device according to the selected operational adjustment option.

15. The method of claim 14, wherein predicting future thermal events based on the selected thermal model comprises executing a linear or non-linear regression thermal model.

16. The method of claim 14, wherein the plurality of operational adjustment options includes an operational adjustment option for reducing a quality of operation of the deployed memory device to prevent exceeding a thermal constraint of the deployed memory device.

17. The method of claim 14, wherein each of the plurality of predefined thermal models is created in the test environment and is further associated with a different command sequence for the memory device; and wherein predicting future thermal events based on the selected thermal model comprises executing a recurrent neural network, a long short-term memory network, or a transformer model.

18. The method of claim 14, wherein the first thermal data further includes first environmental data and/or first thermal sensor data; and wherein the second thermal data further includes second environmental data and/or second thermal sensor data.

* * * * *